F. B. DALE & D. A. CRAWFORD.
GRASS CUTTING MACHINE.
APPLICATION FILED NOV. 13, 1909.

961,485.

Patented June 14, 1910.
3 SHEETS—SHEET 1.

F. B. DALE & D. A. CRAWFORD.
GRASS CUTTING MACHINE.
APPLICATION FILED NOV. 13, 1909.
961,485.
Patented June 14, 1910.
3 SHEETS—SHEET 2.
FIG. 2.
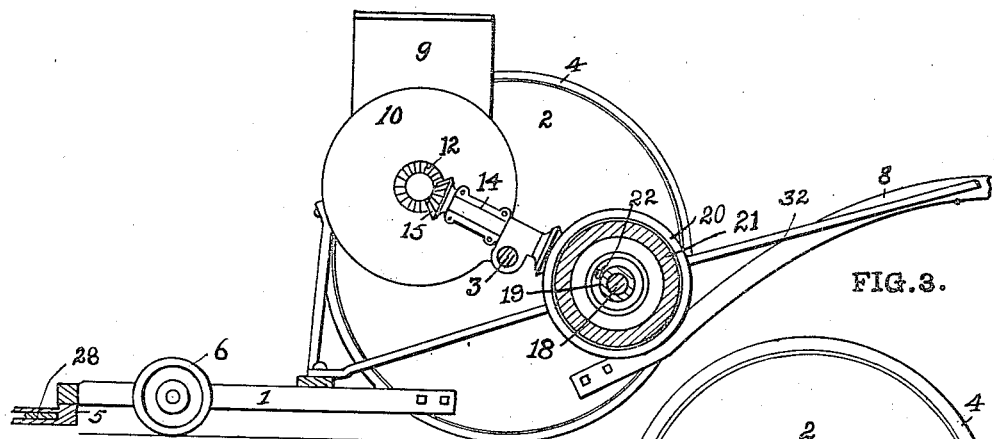
FIG. 3.
FIG. 4.
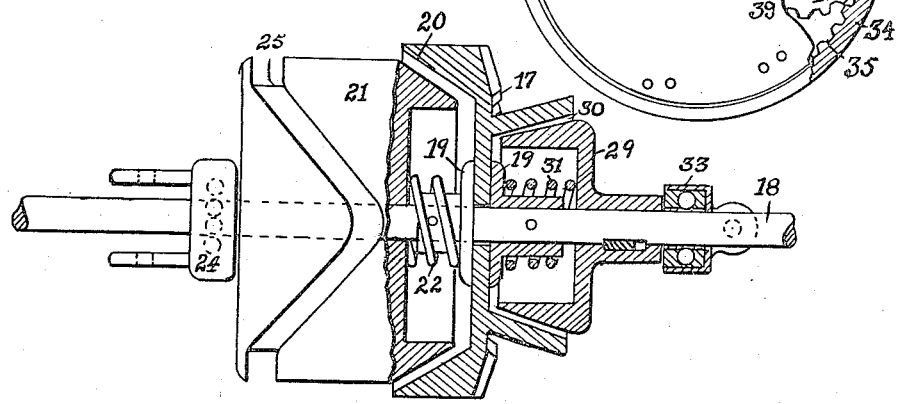
WITNESSES:
INVENTORS
Frank B. Dale and
David A. Crawford,
BY Edward A. Lawrence
their ATTORNEY F. B. DALE & D. A. CRAWFORD.
GRASS CUTTING MACHINE.
APPLICATION FILED NOV. 13, 1909.

Patented June 14, 1910.

WITNESSES:

INVENTORS
Frank B. Dale
David A. Crawford
BY Edward A. Lawrence
Their ATTORNEY

UNITED STATES PATENT OFFICE.

FRANK B. DALE, OF RICHLAND TOWNSHIP, CLARION COUNTY, AND DAVID A. CRAWFORD, OF EMLENTON BOROUGH, PENNSYLVANIA.

GRASS-CUTTING MACHINE.

961,485.  Specification of Letters Patent.  Patented June 14, 1910.

Application filed November 13, 1909. Serial No. 527,761.

*To all whom it may concern:*

Be it known that we, FRANK B. DALE and DAVID A. CRAWFORD, both citizens of the United States, and residing, respectively, in the township of Richland, county of Clarion, and State of Pennsylvania, and in the borough of Emlenton, county of Venango, and State of Pennsylvania, have invented or discovered certain new and useful Improvements in Grass-Cutting Machines, of which the following is a specification.

Our invention consists in a new and improved power driven machine for cutting or mowing of grass, sweeping and for similar purposes. While it is useful for many purposes, it is particularly so for large areas, such as parks, golf links, paved streets in small municipalities &c., where it is undesirable to use horse drawn machines and the ordinary hand machines are unequal to the task.

We have shown our invention applied to a reciprocating knife machine and also to a rotary cutter, and also to a sweeper which is especially useful in the care of putting greens on a golf course to remove the fine cuttings left by the mower.

Figure 1:
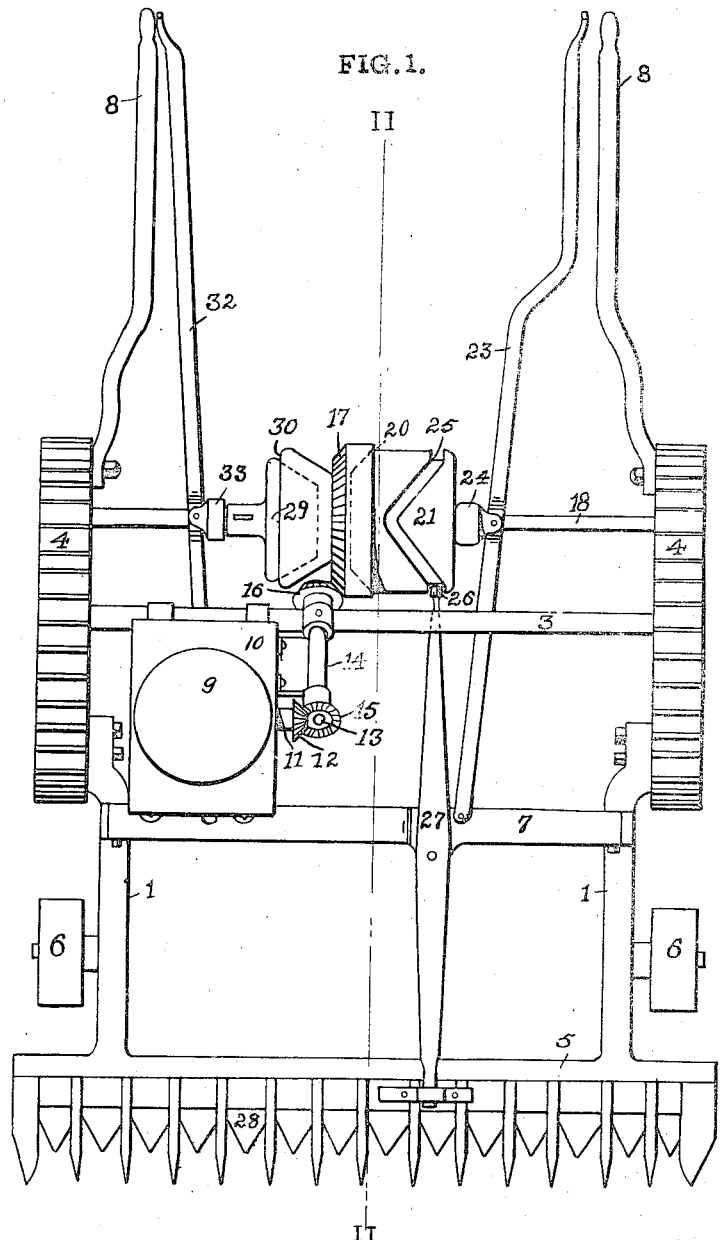
Figure 5:
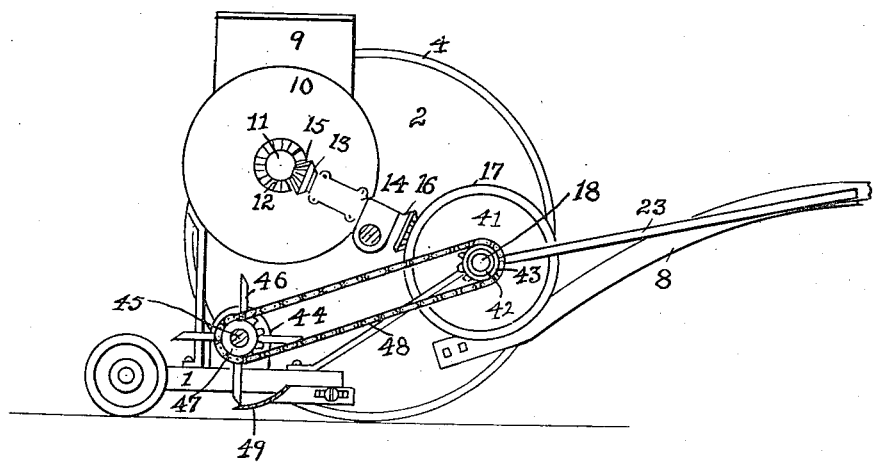
Figure 6:
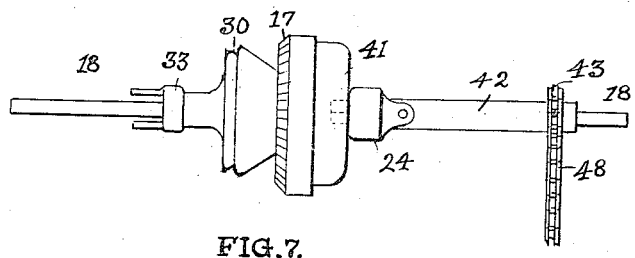
Figure 7:
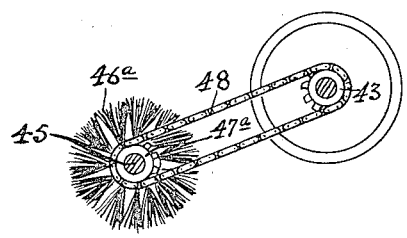

In the accompanying drawings, which are however merely illustrative of the principles of our invention and not intended to limit the same to the embodiment shown, Figure 1 is a plan view showing our invention applied to a reciprocating knife mower; Fig. 2 is a vertical section along the line II—II in Fig. 1; Fig. 3 is an inside elevation of one of the wheels and wheel plates, the latter being partially broken away for the sake of clearness; Fig. 4 is an enlarged plan view showing the operating clutch mechanisms; Fig. 5 is a longitudinal section of the rotary cutter machine; Fig. 6 is a plan view of the clutch mechanisms used therein; and Fig. 7 is a detail view showing a sweeper substituted for the rotary cutter.

The following is a detailed description of the drawings, reference being had first to the reciprocating knife type of machine illustrated in Figs. 1, 2, 3 and 4.

The frame of the machine consists of longitudinal bars 1—1 secured at their rear ends to the circular wheel plates 2—2 which are rigidly mounted on the axle 3 upon the ends of which the wheels 4—4 are rotatably mounted.

5 is the stationary knife secured to the forward ends of bars 1—1.

6—6 are the wheels which support bars 1—1 at the proper elevation.

7 is the cross brace connecting and stiffening the bars 1—1.

8—8 are the handles secured to the wheel plates 2—2.

9 is the cylinder of an explosive engine, or other source of power, mounted on the crank shaft case 10 which is in turn rigidly mounted on the frame of the machine in any convenient manner, as on axle 3 and brace 7 as shown in the drawings.

11 is the crank shaft of the engine provided at its outer end with beveled gear 12.

13 is a shaft journaled in box 14 secured to case 10 and axle 3. One end of shaft 13 is provided with a beveled gear 15 meshing with gear 12 while the other end of shaft 13 is provided with beveled gear 16 which meshes with a larger beveled gear 17 rotatably mounted on shaft 18 whose ends pass through and are journaled in the wheel plates 2—2. The gear wheel 17 is larger than the gear wheel 16 so that the speed of rotation is reduced. The gear wheel 17 is held in alinement on shaft 18 by means of flanged collars 19—19 rigidly secured to shaft 18 on either side of said wheel 17. The wheel 17 is provided with a friction clutch face 20 on one side.

21 is a sliding clutch member rotatably mounted on shaft 18 and normally kept out of engagement with clutch face 20 by means of a spring 22 coiled about the adjacent collar 19.

23 is a lever having its forward end pivoted to brace 7 and its rear or handle end in convenient proximity to one of the handles 8 so as to be in easy reach of the operator. Said lever is secured to clutch member 21 by means of ball-bearing connection 24. It is evident that by means of the lever 23 the clutch member 21 may be brought into operative connection with the wheel 17 to receive rotary motion from the same.

Formed in the periphery of member 21 is a continuous zigzag groove 25 which is occupied by anti-friction roller or member 26 on the end of lever 27 which is pivoted, intermediate of its length to brace 7. The forward end of the lever is loosely secured to the movable knife 28 whereby said movable knife is reciprocated in relation to stationary knife 5 when the member 21 is brought into engagement with the clutch face 20 of the wheel 17. On the opposite side of wheel 17 from member 21 is a second clutch member 29 feathered on shaft 18 to be rotated therewith but slidable thereon. On the adjacent face of wheel 17 is a clutch face 30 with which said member 29 may be slid into engagement whereby rotation is imparted to said member 29 and the shaft 18. 31 is a coiled spring mounted on the adjacent collar 19 and normally maintaining member 29 out of engagement with the clutch face 30 of wheel 17.

32 is a lever attached to the member 29 by means of a ball-bearing connection 33.

It is evident that the operator may at will throw the clutch member 29 into engagement with the wheel 17 and thus rotate shaft 18.

The wheels 4—4 are provided with the usual rim flanges 34 fitted with internal cog-teeth 35—35. On the ends of the shaft 18 are mounted the gears 36—36 having external teeth 37—37 meshing with teeth 35—35 of the wheels 4—4. Said gears 36—36 are also provided with internal notches 38—38 which are adapted to be engaged by the sliding pawls 39 seated in slots 40 in the ends of shaft 18. It is evident that when the shaft 18 is power driven, in the manner described, the pawls 39—39 engage the internal notches 38—38 of the gears 36—36, rotating said gears with the shaft 18 and with them the wheels 4—4, thus advancing the machine over the ground. When the power is off, the machine may be advanced by hand by pushing on the handles 8—8, the pawls 39—39 trailing over the notches 38—38 and permitting the gears 36—36 to rotate with the wheels 4—4. When the power is off the machine may be drawn rearwardly by hand, the idle shaft 18 rotating with the gears 36—36. It is thus evident that the knives or other operative parts may be operated by the engine or other source of power while the machine is being advanced or retreated by hand, thus enabling the operator to readily cut or sweep about trees, curbs, fences and other obstructions, and, again, the machine may be advanced by power while the cutting, sweeping or other operative parts remain idle, thus enabling the machine to be moved from place to place as necessity may demand.

In the modified form of machine, shown in Figs. 5, 6 and 7, instead of the grooved clutch member 21, we substitute a clutch member 41, Fig. 6, which rotates with but is slidably mounted on a sleeve 42 rotatably mounted on but not slidable in the shaft 18. The outer end of sleeve 42 is provided with a rigidly mounted sprocket 43. A bracket 44 is provided on each bar 1 of the frame and between said brackets is journaled a removable shaft 45 on which is mounted a rotary cutter 46 provided with a rigid sprocket 47 operatively connected with sprocket 43 by a chain 48. 49 is the fixed blade coöperating with the rotary cutter 46. It is evident that when the lever 23 is used to throw the clutch member 41 into frictional engagement with clutch face 20 of wheel 17, the sleeve 42 and sprocket 43 are rotated, and with them the cutter 46. When it is desired to sweep with the machine, the shaft 45 is withdrawn from brackets 44 and the rotary sweeper, or other tool, 46$^a$ provided with rigid sprocket 47$^a$ is substituted for rotary cutter 46.

It is evident that in the modified form of machine, the cutter or sweeper may be power driven while the machine is being advanced or retreated by hand, and, on the other hand, the cutter or sweeper may be idle while the machine is being advanced under power.

We have shown an explosive engine as the source of power but any other convenient source of power may be substituted.

What we desire to claim is:—

1. In a grass cutting machine, a source of power mounted on the machine, a double clutch member loosely mounted on the machine and rotated by said source of power, a second clutch member adapted to transmit rotary motion to the traction wheels of the machine and to be brought into engagement with said first clutch member, a third clutch member, provided with a zigzag perimetral groove and loosely mounted on said machine, adapted to be brought into engagement with said first clutch member, and a lever actuating the cutting mechanism of said machine and engaging said groove.

2. In a grass cutting machine, a source of power mounted on the machine, a shaft adapted to transmit rotary motion to the traction wheels of the machine, a double clutch member loosely mounted on said shaft and rotated by said source of power, a second clutch member slidably mounted on said shaft but rotating therewith and adapted to be brought into engagement with said first clutch member, and a third clutch member, loosely mounted on said shaft and operatively connected with the cutting mechanism of said machine, adapted to be brought into engagement with said first mentioned clutch member.

3. In a grass cutting machine, a source of power mounted on the machine, a shaft adapted to transmit rotary motion to the traction wheels of the machine, a double clutch member loosely mounted on said shaft and rotated by said source of power, a second clutch member slidably mounted on said shaft but rotating therewith and adapted to be brought into engagement with said first clutch member, a third clutch member, provided with a zigzag perimetral groove and loosely mounted on said shaft, adapted to be brought into engagement with said first clutch member, and a lever actuating the cutting mechanism of said machine and engaging said groove.

Signed at Foxburg, Pennsylvania, this 10th day of November, 1909.

FRANK B. DALE.
DAVID A. CRAWFORD.

Witnesses:
PETER TOY,
I. B. BAKER.